United States Patent
Satou (12) United States Patent (10) Patent No.: US 8,005,599 B2
Satou (45) Date of Patent: Aug. 23, 2011

(54) LUBRICATING OIL SUPPLY CONTROL DEVICE FOR TRANSMISSION OF VEHICLE

(75) Inventor: Yoshiharu Satou, Mooka (JP)

(73) Assignee: Komatsu Ltd., Tokyo (JP)

( * ) Notice: Subject to any disclaimer, the term of this patent is extended or adjusted under 35 U.S.C. 154(b) by 970 days.

(21) Appl. No.: 10/572,282

(22) PCT Filed: Jul. 14, 2005

(86) PCT No.: PCT/JP2005/013068
§ 371 (c)(1),
(2), (4) Date: Mar. 16, 2006

(87) PCT Pub. No.: WO2006/009080
PCT Pub. Date: Jan. 26, 2006

(65) Prior Publication Data
US 2008/0234903 A1 Sep. 25, 2008

(30) Foreign Application Priority Data
Jul. 16, 2004 (JP) ................................ 2004-210366

(51) Int. Cl.
*G06F 7/00* (2006.01)
*G06F 17/00* (2006.01)

(52) U.S. Cl. ........... 701/51; 701/61; 477/158; 477/159; 477/160; 477/161; 475/159

(58) Field of Classification Search ................. 701/1, 36, 701/51, 53, 54, 61; 476/2, 7–10; 123/196 R
See application file for complete search history.

(56) References Cited

U.S. PATENT DOCUMENTS

| | | | |
|---|---|---|---|
| 5,522,476 A * | 6/1996 | Holman ................ 184/6.12 |
| 5,662,188 A | 9/1997 | Ito et al. | |
| 6,056,094 A * | 5/2000 | Sakai ................ 192/3.3 |
| 6,203,467 B1 * | 3/2001 | Yamamoto et al. ........ 476/8 |
| 6,217,473 B1 * | 4/2001 | Ueda et al. ............ 475/216 |
| 6,641,498 B2 | 11/2003 | Okuwaki | |
| 2002/0028725 A1 | 3/2002 | Totsuka et al. | |
| 2002/0086759 A1* | 7/2002 | Imai et al. ............ 475/116 |

(Continued)

FOREIGN PATENT DOCUMENTS
DE 103 08 502 9/2004
(Continued)

OTHER PUBLICATIONS

German Office Action (with English translation) issued Jan. 22, 2009 in German Application No. 11 2005 00 55.9-12.

(Continued)

*Primary Examiner* — Jack Keith
*Assistant Examiner* — Rami Khatib
(74) *Attorney, Agent, or Firm* — Wenderoth, Lind & Ponack L.L.P.

(57) ABSTRACT

A lubricating oil supply control device for delivering lubricating oil to the transmission of a vehicle is provided which overcomes disadvantages of the prior art by providing a simple and reliable configuration which does not require the addition of new sensors to an existing device. The lubricating oil supply control device includes, in part, an engine controller and a transmission controller, a lubricating oil supplying oil passage, a bypass oil passage, a relief valve or a control valve, a restrictor, and a lubricating oil supply controlling controller.

16 Claims, 6 Drawing Sheets

U.S. PATENT DOCUMENTS

2004/0067816 A1    4/2004    Taketsuna et al.

FOREIGN PATENT DOCUMENTS

| | | |
|---|---|---|
| JP | 61-91658 | 6/1986 |
| JP | 62-199562 | 12/1987 |
| JP | 1-169161 | 7/1989 |
| JP | 1-242872 | 9/1989 |
| JP | 5-106732 | 4/1993 |
| JP | 5-263895 | 10/1993 |
| JP | 6-26565 | 2/1994 |
| JP | 10-141480 | 5/1998 |
| JP | 2001-330107 | 11/2001 |
| JP | 2002-195371 | 7/2002 |

OTHER PUBLICATIONS

Foreign Office Action (with English translation) issued Jun. 30, 2009 in connection with corresponding Japanese Patent Application No. 2006-526818.

Japanese Office Action issued Sep. 15, 2009 in connection with corresponding Japanese Patent Application No. 2006-526818 (with English translation).

Japanese Office Action issued Jun. 22, 2010 in corresponding Japanese Application No. 2006-526818.

\* cited by examiner

LUBRICATING OIL SUPPLY CONTROL DEVICE FOR TRANSMISSION OF VEHICLE

TECHNICAL FIELD

The present invention relates to a device for controlling supply of lubricating oil to a transmission of a vehicle.

BACKGROUND ART

It is necessary to supply lubricating oil to gears and friction engagement elements (speed change clutch) and the like which configure the transmission of the vehicle to perform reduction of mechanical friction, cooling, corrosion prevention and the like.

Patent literature 1 described later discloses an invention that supplies a lubricating oil amount, which is required in accordance with an operating state of a planetary gear transmission, to the transmission.

Specifically, the patent literature 1 has achieved its object by the following means.

a) A speed change stage, a throttle opening and the like are detected by individual sensors, the detection signals by the individual sensors are input to an electronic control device (controller), the lubricating oil amount required for the transmission is calculated by the controller, and an electric signal indicating the required lubricating oil amount is output.

b) A first regulator adjusts the pressure of the pressure oil, which is discharged from the hydraulic pump, to a line pressure and outputs to a line pressure oil passage.

c) An electric signal corresponding to the required lubricating oil amount output from the controller is input to a solenoid valve, and a lubrication signal pressure is output from the solenoid valve to a lubrication signal pressure oil passage.

d) A second control valve is connected to the line pressure oil passage and the lubrication signal pressure oil passage, and the second control valve operates a spool in accordance with the lubrication signal pressure which is supplied from the lubrication signal pressure oil passage, with the line pressure, which is supplied from the line pressure oil passage, determined as a base pressure, and outputs a lubrication pressure to the upstream side of an orifice.

e) The required lubricating oil amount corresponding to the lubrication pressure is supplied to the transmission via the orifice. The pressure on the upstream side of the orifice is input as a feedback pressure to the second control valve.

Patent Literature 1: Japanese Patent Application Laid-Open No. 10-141480

BRIEF SUMMARY OF THE INVENTION

Problems to be Solved by the Invention

According to the invention described in the patent literature 1, it is necessary to dispose various types of sensors for detecting a speed change stage, a throttle opening and the like to calculate the required lubricating oil amount as described in the above item a). Therefore, it is necessary to add a new sensor to the existing device. It is also necessary to convert the sensor-detected signal to an engineering unit necessary for arithmetic processing by performing signal processing by the controller. The controller needs to perform processing to calculate the lubricating oil amount for the transmission in accordance with the detection values of the individual sensors. Therefore, the processing performed by the controller becomes complex. As a result, the cost for configuring the device of a control system increases.

As described in the above items b), c), d) and e), it is necessary to convert finally the discharge pressure of the hydraulic pump to a desired lubrication pressure by the hydraulic circuit. Therefore, the regulator is essential as a control valve, and lots of hydraulic pipes are required to transfer hydraulic pressure signals among the valves. Therefore, when a device of a hydraulic system is configured, the structure of the valve body and the arrangement of the hydraulic pipes become complex, and the cost increases.

The present invention has been made under the circumstances described above and remedies the problems by eliminating the necessity of addition of a new sensor at the time of configuring a lubricating oil supply control device for a transmission and simplifying arithmetic processing which is performed by a controller, thereby simplifying the device of the control system and educing cost.

And, the present invention simplifies the structure of the device of the hydraulic system by simplifying the configuration of the valve body and the arrangement of the hydraulic pipes at the time of configuring the lubricating oil supply control device of the transmission, thereby enabling to configure it at a low cost.

Means for Solving the Problems

A first embodiment of the present invention is a lubricating oil supply control device for a transmission of a vehicle that is driven by an output of an engine transmitted to the transmission, comprising:

an engine controller for controlling the engine;

a transmission controller for controlling the transmission;

a lubricating oil supplying oil passage for guiding lubricating oil, which is discharged from a hydraulic pump, to the transmission;

a bypass oil passage for guiding the lubricating oil, which is in the lubricating oil supplying oil passage, to a tank;

a relief valve for discharging the lubricating oil, which is in the lubricating oil supplying oil passage, to the tank through the bypass oil passage, and the relief valve being operated in accordance with a control electric signal;

a restrictor that is disposed in a part of an outlet or an inlet of the relief valve; and a lubricating oil supply controlling controller to which control information of the engine controller and/or control information of the transmission controller is input and that generates and outputs the control electric signal for operating the relief valve in accordance with the control information.

A second embodiment of the present invention is a lubricating oil supply control device for a transmission of a vehicle that is driven by an output of an engine transmitted to the transmission, comprising:

an engine controller for controlling the engine;

a transmission controller for controlling the transmission;

a lubricating oil supplying oil passage for guiding lubricating oil, which is discharged from a hydraulic pump, to the transmission;

a bypass oil passage for guiding the lubricating oil, which is in the lubricating oil supplying oil passage, to a tank;

a control valve for adjusting an amount of the lubricating oil that is guided to the transmission through the lubricating oil supplying oil passage and an amount of the lubricating oil that is guided from the lubricating oil supplying oil passage to the tank through the bypass oil passage, and the control valve being operated in accordance with a control electric signal; and a lubricating oil supply controlling controller to which control information of the engine controller and/or control information of the transmission controller is input, and that generates and outputs the control electric signal for operating the control valve in accordance with the control information.

A third embodiment of the present invention is a lubricating oil supply control device for a transmission of a vehicle that is driven by an output of an engine transmitted to the transmission, comprising:

a lubricating oil supplying oil passage for guiding lubricating oil, which is discharged from a hydraulic pump, to the transmission;

a bypass oil passage for guiding the lubricating oil, which is in the lubricating oil supplying oil passage, to a tank;

a relief valve for discharging the lubricating oil, which is in the lubricating oil supplying oil passage, to the tank through the bypass oil passage, and the relief valve being operated in accordance with a control electric signal;

a restrictor that is disposed in a part of an outlet or an inlet of the relief valve; and a lubricating oil supply controlling controller for outputting the control electric signal for operating the relief valve.

A fourth embodiment of the present invention is a lubricating oil supply control device for a transmission of a vehicle that is driven by an output of an engine transmitted to the transmission, comprising:

a lubricating oil supplying oil passage for guiding lubricating oil, which is discharged from a hydraulic pump, to the transmission;

a bypass oil passage that guides the lubricating oil, which is in the lubricating oil supplying oil passage, to a tank;

a control valve for adjusting an amount of the lubricating oil that is guided to the transmission through the lubricating oil supplying oil passage and an amount of the lubricating oil that is guided from the lubricating oil supplying oil passage to the tank through the bypass oil passage, and the control valve being operated in accordance with a control electric signal; and a lubricating oil supply controlling controller for outputting the control electric signal for operating the control valve.

Figure 1:
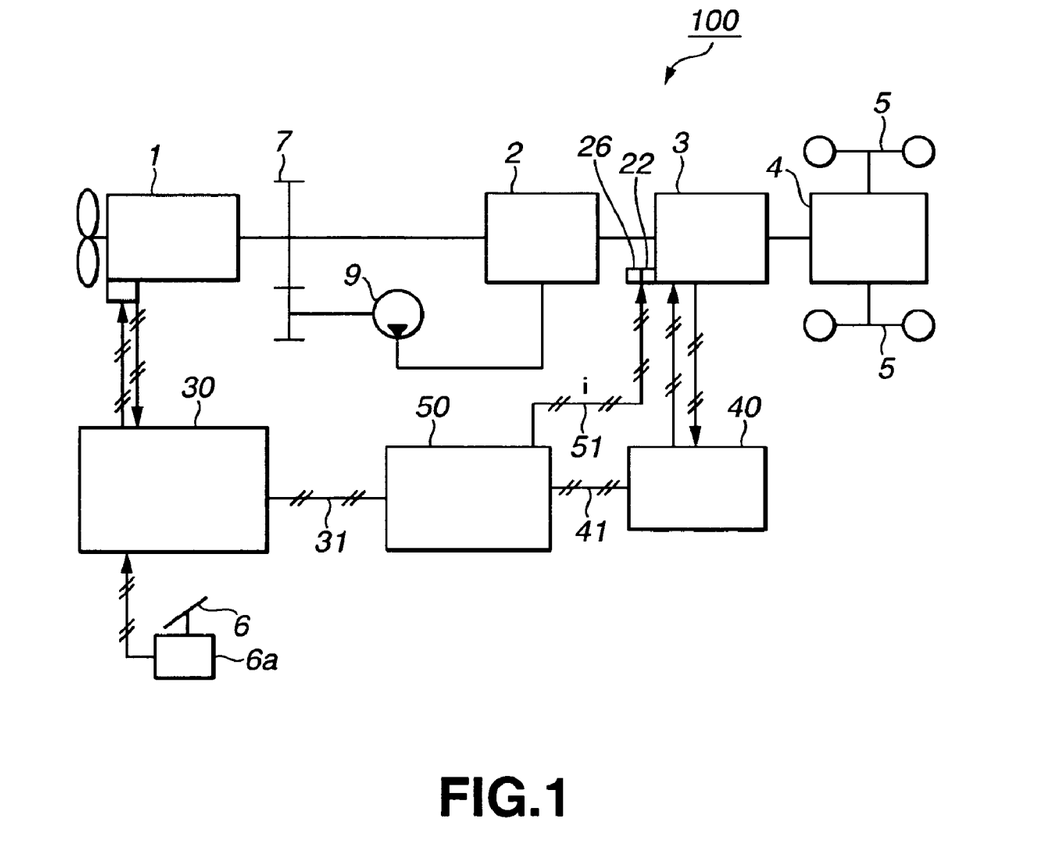
FIG. 1 is a structure diagram of a vehicle of an embodiment.
Figure 2:
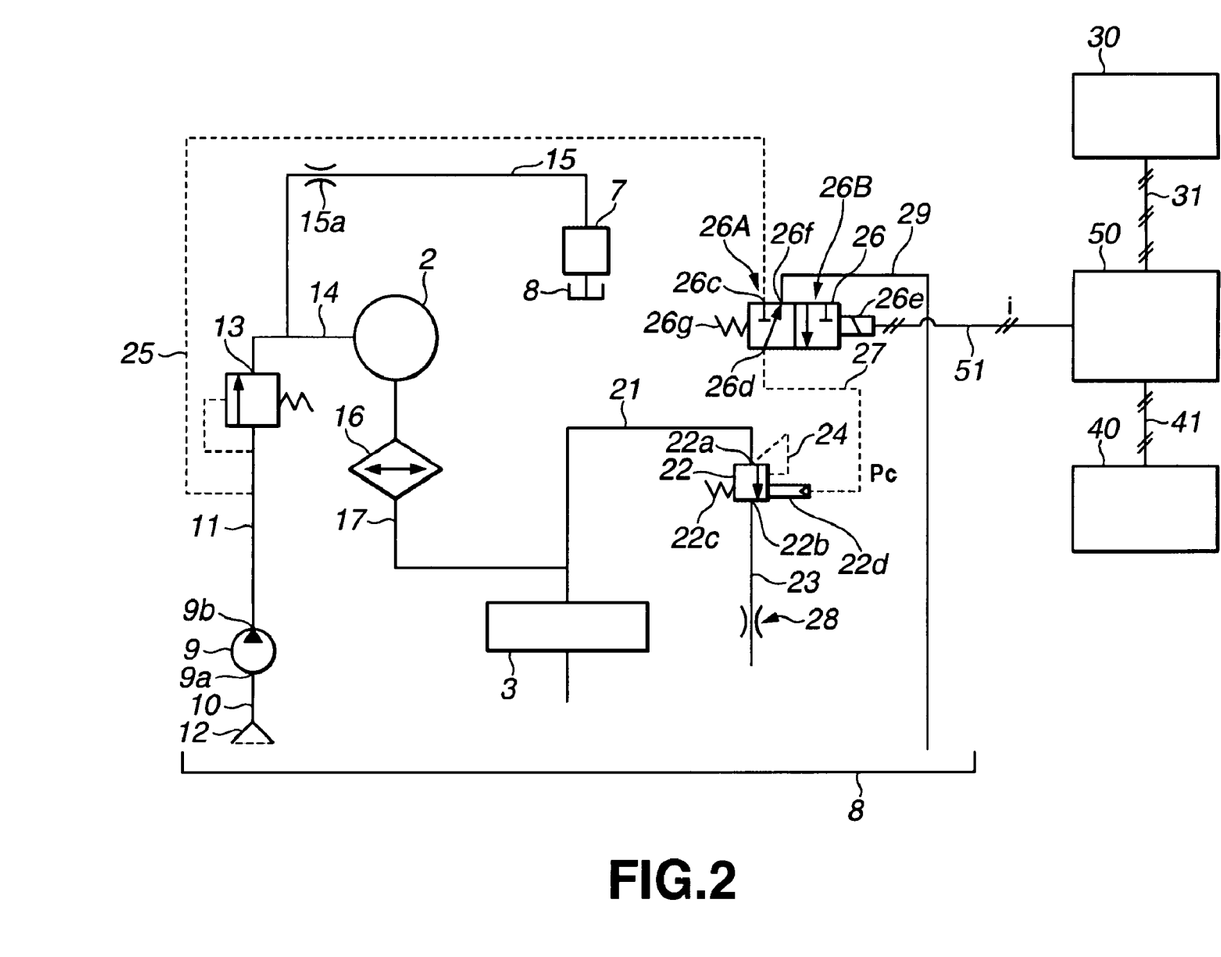
FIG. 2 is a hydraulic circuit diagram of the first embodiment.

As shown in FIG. 1 and FIG. 2, the lubricating oil supply control device for the transmission 3 according to the first invention comprises an engine controller 30 for controlling an engine 1; a transmission controller 40 for controlling the transmission 3; a lubricating oil supplying oil passage 17 for guiding lubricating oil, which is discharged from a lubricating hydraulic pump 9, to the transmission 3; bypass oil passages 21, 23 for guiding the lubricating oil, which is in the lubricating oil supplying oil passage 17, to a lubricating oil tank 8; a relief valve 22 for discharging the lubricating oil, which is in the lubricating oil supplying oil passage 17, to the lubricating oil tank 8 through the bypass oil passages 21, 23 and operating in accordance with a control electric signal i; a restrictor 28 which is disposed in a part of an outlet of the relief valve 22; and a lubricating oil supply controlling controller 50 to which control information of the engine controller 30 and (or) control information of the transmission controller 40 are input and which generates and outputs the control electric signal i for operating the relief valve 22 in accordance with the control information.

When the control electric signal i for operating the relief valve 22 is output from the lubricating oil supply controlling controller 50 (judged YES in either step 102 or 103 in FIG. 3; step 104), the relief valve 22 operates to open.

Therefore, the lubricating oil which is guided to the lubricating oil supplying oil passage 17 is partly flown through the relief valve 22 via the bypass oil passage 21. The lubricating oil which has flown through the relief valve 22 is discharged to the lubricating oil tank 8 via the bypass oil passage 23 and the restrictor 28.

The rest of the lubricating oil which is guided to the lubricating oil supplying oil passage 17 is supplied to the transmission 3.

Figure 3:
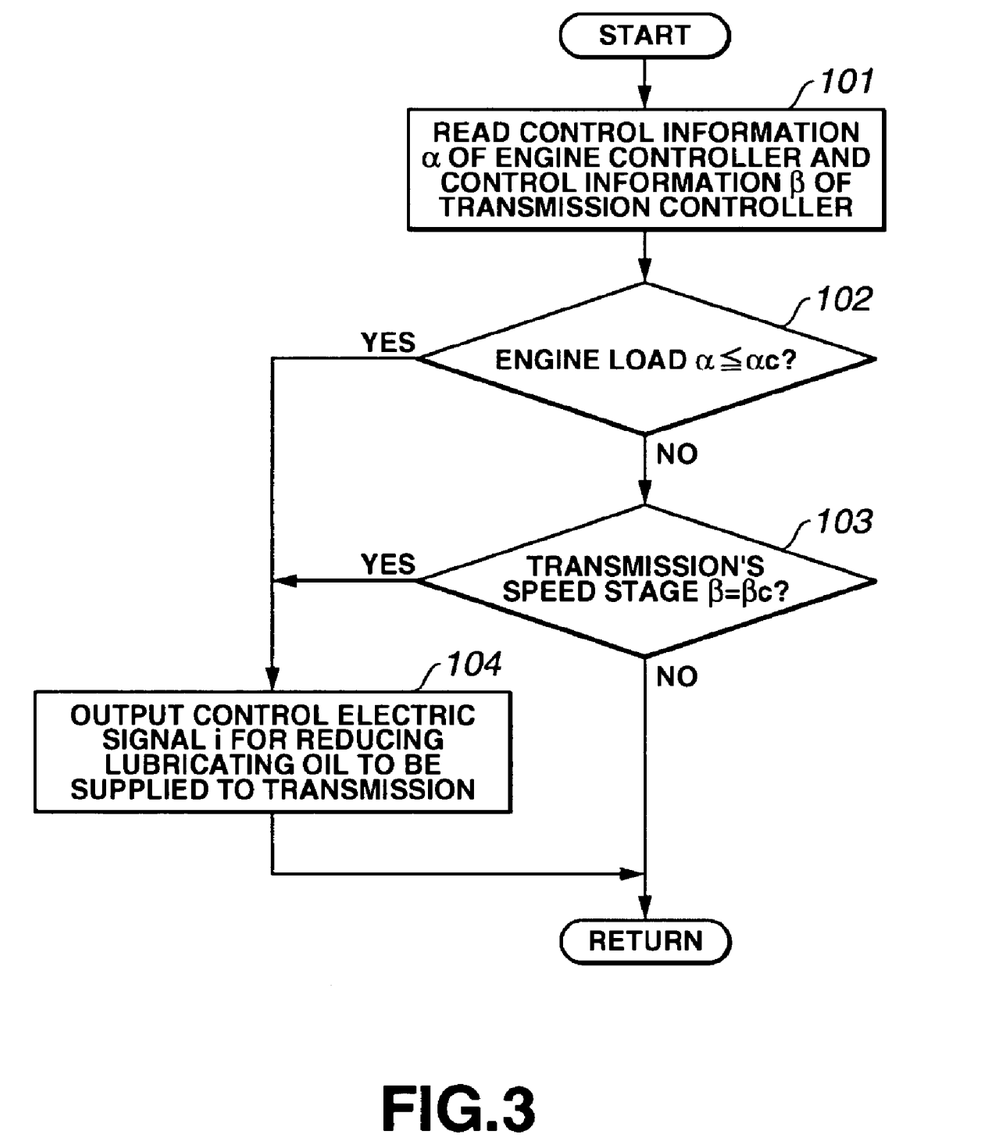
FIG. 3 is a flow chart showing a processing procedure performed by the controller of an embodiment.

According to the present invention, when the engine 1 has a low load or the transmission 3 has a low load (judged YES in step 102 or judged YES in step 103), the control electric signal i is output from the lubricating oil supply controlling controller 50 (step 104), and the lubricating oil which is to be supplied to the transmission 3 is partly discharged to the lubricating oil tank 8. Thus, a mechanical friction of the transmission 3 is decreased and its cooling is performed to protect the component parts of the transmission 3, while the lubricating oil is prevented from being supplied excessively to decrease a power loss of the transmission 3, thereby enabling to improve the fuel consumption of the engine 1 and to attain energy saving.

And, according to the present invention, the control information of the engine controller 30 and the control information of the transmission controller 40 are input to the lubricating oil supply controlling controller 50, and the control electric signal i is output in accordance with the control information to operate the relief valve 22, thereby controlling the supply of the lubricating oil. Therefore, the control system can be configured easily at a low cost by using the existing control information which is used by the existing engine controller 30 and transmission controller 40. In other words, it is not necessary to add a new sensor in order to obtain the control information. It is not necessary to process the detection signals of the sensors by the controller and to convert into an engineering unit required for arithmetic processing. And, it is not necessary to calculate newly the load of the engine and the load of the transmission by the controller in accordance with the detections values of the various types of sensors. Therefore, the processing performed by the controller can be simplified as exemplified in FIG. 3.

According to the invention, the hydraulic circuit is configured such that the relief valve 22 is operated to discharge the lubricating oil, which is in the lubricating oil supplying oil passage 17, to the lubricating oil tank 8 through the bypass oil passage 21, the relief valve 22, and the bypass oil passage 23. Therefore, it is sufficient by adding a valve body and piping to the existing lubricating oil supplying oil passage 17 of the hydraulic circuit to discharge the lubricating oil, which is in the lubricating oil supplying oil passage 17. Thus, to configure the device of the hydraulic system, the valve body structure and the arrangement of the hydraulic pipes can be made simple, and the cost can be reduced.

Figure 6:
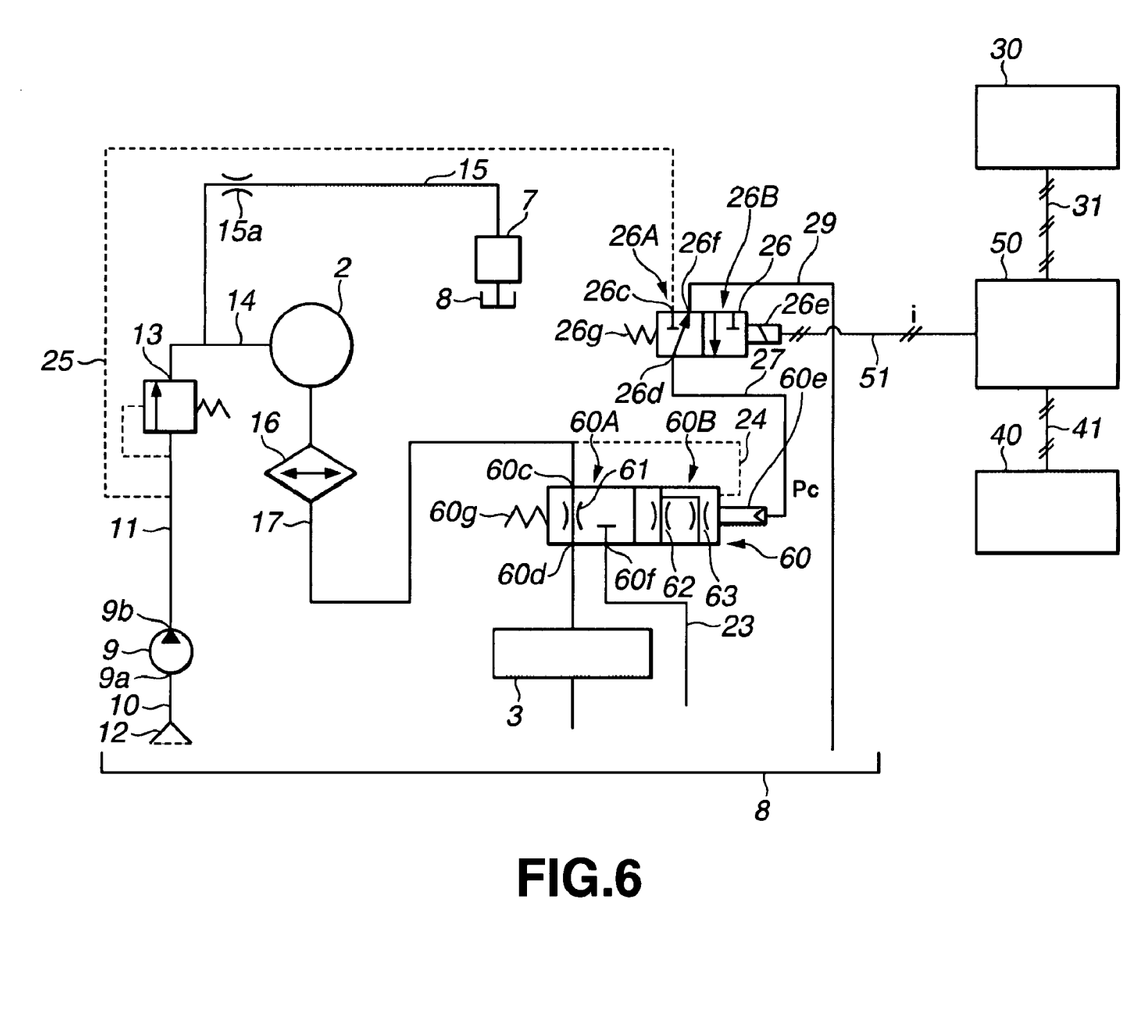
FIG. 6 is a hydraulic circuit diagram of the third embodiment.

According to the second invention, instead of the relief valve 22 and the restrictor 28 of the first invention, a control valve 60 having the same functions is used. In other words, as shown in FIG. 6, the control valve 60 adjusts an amount of the lubricating oil which is guided to the transmission 3 through the lubricating oil supplying oil passage 17 and an amount of the lubricating oil which is guided from the lubricating oil supplying oil passage 17 to the lubricating oil tank 8 through the bypass oil passage 23 in accordance with the control electric signal i which is output from the lubricating oil supply controlling controller 50.

According to the first invention and the second invention, the control information of the engine controller 30 and the transmission controller 40 is input to the lubricating oil supply controlling controller 50 to control the supply of the lubricating oil, but the lubricating oil supply controlling controller 50 may control the supply of the lubricating oil in accordance with information other than the control information of the engine controller 30 and the transmission controller 40 (the third invention, and the fourth invention).

DETAILED DESCRIPTION OF THE INVENTION

Embodiments of the lubricating oil supply control device for the transmission of the vehicle according to the invention will be described below with reference to the drawings. It is assumed in the embodiments that the vehicle is a wheel loader.

First Embodiment

FIG. 1 is a diagram showing a structure of a power transmission path of a wheel loader 100. FIG. 2 is a diagram showing a structure of a lubricating oil supply circuit of the wheel loader 100.

The lubricating oil supply control device for a transmission 3 of this embodiment is generally comprised of the engine controller 30 for controlling the engine 1, the transmission controller 40 for controlling the transmission 3, the lubricating oil supplying oil passage 17 for guiding the lubricating oil, which is discharged from the lubricating oil pump 9, to the transmission 3, the bypass oil passages 21, 23 for guiding the lubricating oil, which is in the lubricating oil supplying oil passage 17, to the lubricating oil tank 8, the relief valve 22 for discharging the lubricating oil, which is in the lubricating oil supplying oil passage 17, to the lubricating oil tank 8 through the bypass oil passages 21, 23 and operating in accordance with the control electric signal i, the restrictor 28 which is disposed in the part of the outlet of the relief valve 22, and the lubricating oil supply controlling controller 50 to which control information of the engine controller 30 and control information of the transmission controller 40 are input and which generates and outputs the control electric signal i for operating the relief valve 22 in accordance with the control information.

Additionally, an output shaft of the engine 1 of the wheel loader 100 is coupled with a PTO shaft 7. The PTO shaft 7 is coupled with the torque converter 2. Output of the engine 1 is transmitted to driving wheels 5 via the PTO shaft 7, the torque converter 2, the transmission 3, and a differential gear 4.

A gas pedal 6 is disposed in the operator's cabin of the wheel loader 100. An operation amount (depressing amount) is detected by a stroke sensor 6a which is disposed for the gas pedal 6, and a signal indicating the operation amount is input to the engine controller 30.

The engine controller 30 controls the engine 1 in accordance with the input signal from the stroke sensor 6a so that the number of revolutions of the engine 1 becomes a target number of revolutions corresponding to the operation amount of the gas pedal 6.

The engine 1 is a diesel engine, and its output is controlled by adjusting an injection quantity injected into a cylinder. This adjustment is made by changing a stroke of a plunger of the fuel injection pump of the engine 1 by a control rack of an electric governor.

The engine controller 30 receives input of actual engine revolutions, control rack position and the like and outputs a control electric signal to the electric governor so that a difference between a target number of revolution and the actual number of revolution is eliminated, thereby controlling a control rack position of the electric governor.

The control electric signal which is output from the engine controller 30 is output as control information indicating a load (fuel injection quantity) of the engine 1, as described later, to the lubricating oil supply controlling controller 50 through an electrical signal line 31.

The transmission 3 is configured of, for example, a planetary gear transmission. The planetary gear transmission is comprised of plural sets of hydraulic clutches and plural sets of planetary gear mechanisms and changes a speed by changing a flow of power for transmitting the plural sets of planetary gear mechanisms in accordance with the selection of the hydraulic clutches. The plural sets of hydraulic clutches comprise a forward hydraulic clutch, a reverse hydraulic clutch, and a speed stage hydraulic clutch, namely, a first speed hydraulic clutch, a second speed hydraulic clutch, a third speed hydraulic clutch and a fourth speed (maximum speed stage) hydraulic clutch. While the forward hydraulic clutch or the reverse hydraulic clutch is selected, any of the speed stage hydraulic clutches is selected, depending on the vehicle speed or the like, to change the speed.

The transmission 3 is provided with a proportional electromagnetic control valve for each of the hydraulic clutches. According to the control electric signal (control information) applied to the proportional electromagnetic control valve, the pressure oil is supplied to the corresponding hydraulic clutch, and the hydraulic clutch is engaged.

The transmission controller 40, by receiving inputs of an operation position of the running operation lever, a vehicle speed and the like, selects either the forward hydraulic clutch or the reverse hydraulic clutch and any of the speed stage clutches, and outputs the control electric signal for engaging the selected hydraulic clutch to the proportional electromagnetic control valve of the corresponding hydraulic clutch.

The control electric signal which is output from the transmission controller 40 is output, as control information indicating a load (speed stage) of the transmission 3, to the lubricating oil supply controlling controller 50 through an electrical signal line 41 as described later.

The transmission 3 comprises a speed change mechanism section having a planetary gear mechanism (mating mechanism) and a clutch portion having a clutch (friction engagement element).

It is necessary to supply the lubricating oil to the speed change mechanism section of the transmission 3 and the clutch portion to perform reduction of mechanical friction, cooling, corrosion prevention and the like.

The lubricating oil tank 8 which configures a part of the casing of the transmission 3 is disposed below the transmission 3.

The drive shaft of the lubricating oil pump 9 is coupled to the PTO shaft 7.

The output of the engine 1 is transmitted to the lubricating oil pump 9 through the PTO shaft 7 to drive the lubricating oil pump 9.

A suction port 9a of the lubricating oil pump 9 is communicated with the lubricating oil tank 8 through a sucking oil passage 10. The sucking oil passage 10 is provided with a strainer 12.

A discharge port 9b of the lubricating oil pump 9 is communicated with an inlet port of a main relief valve 13 through a pump outlet oil passage 11. The outlet port of the main relief valve 13 is communicated with an inlet of the torque converter 2 through an oil passage 14.

An oil passage 15 is communicated with the oil passage 14. The oil passage 15 is provided with a restrictor 15a and communicated with the PTO shaft 7.

The outlet of the torque converter 2 is communicated with the inlet of an oil cooler 16.

The lubricating oil which flows through the oil cooler 16 is cooled by a flow of air formed by an unshown cooling fan.

The outlet of the oil cooler 16 is communicated with the lubricating oil supplying oil passage 17. The lubricating oil supplying oil passage 17 is communicated with the transmission 3 and supplies the lubricating oil to the speed change mechanism section of the transmission 3, the clutch portion and the like. The pressure oil discharged from the lubricating oil pump 9 is also used as an original pressure of the pressure oil which is supplied to the hydraulic clutch.

The lubricating oil supplying oil passage 17 is communicated with the bypass oil passage 21.

The bypass oil passage 21 is communicated with an inlet port 22a of the relief valve 22. An outlet port (tank port) 22b of the relief valve 22 is communicated with the bypass oil passage 23. The bypass oil passage 23 is provided with the restrictor 28. The downstream side of the restrictor 28 is communicated with the lubricating oil tank 8.

One end of a spring 22c which determines a prescribed relief pressure is contacted to one end of a spool or a ball of the relief valve 22. A pressure receiving surface of the other end (the opposite side of the spring 22c) of the spool or the ball of the relief valve 22 is communicated with the inlet port 22a through a pilot oil passage 24.

Similarly, the other end (the opposite side of the spring 22c) of the spool or the ball of the relief valve 22 is provided with a pilot port 22d to which a pilot pressure Pc is applied.

The pump outlet oil passage 11 is branched to a pilot oil passage 25.

The pilot oil passage 25 is communicated with an inlet port 26c of an electromagnetic control valve 26.

An outlet port 26d of the electromagnetic control valve 26 is communicated with the pilot port 22d of the relief valve 22 through a pilot oil passage 27.

A tank port 26f of the electromagnetic control valve 26 is communicated with the lubricating oil tank 8 through an oil passage 29.

An electromagnetic solenoid 26e of the electromagnetic control valve 26 is electrically connected to the lubricating oil supply controlling controller 50 through an electrical signal line 51.

The lubricating oil supply controlling controller 50 is electrically connected to the engine controller 30 through the electrical signal line 31.

The lubricating oil supply controlling controller 50 is electrically connected to the transmission controller 40 through the electrical signal line 41.

In FIG. 2, the lubricating oil supply controlling controller 50 is shown as a separate body of the engine controller 30 and the transmission controller 40, but the lubricating oil supply controlling controller 50 may be configured as one body with the engine controller 30. The lubricating oil supply controlling controller 50 may also be configured into one body with the transmission controller 40.

The electromagnetic control valve 26 is a two position valve having two valve positions 26A, 26B. One end of a spring 26g is contacted to the spool of the electromagnetic control valve 26 on the side opposite to the electromagnetic solenoid 26e.

The electromagnetic control valve 26 is switched between the valve positions 26A and 26B depending on the control electric signal i applied to the electromagnetic solenoid 26e.

In a case where the control electric signal i is not applied to the electromagnetic solenoid 26e, the spool of the electromagnetic control valve 26 is switched to the lubricating oil supply position 26A by a spring force of the spring 26g. And, the outlet port 26d and the tank port 26f of the electromagnetic control valve 26 are mutually communicated.

Where the control electric signal i is applied to the electromagnetic solenoid 26e, a pushing force is generated by the electromagnetic solenoid 26e. The pushing force is more powerful than the spring force of the spring 26g and switches the spool of the electromagnetic control valve 26 to the lubricating oil discharge position 26B. Then, the inlet port 26c and the outlet port 26d of the electromagnetic control valve 26 are mutually communicated.

FIG. 3 is a flow chart showing a processing procedure performed by the lubricating oil supply controlling controller 50. A program corresponding to the flow chart has been installed in the lubricating oil supply controlling controller 50.

Control information of the engine controller 30 is sent to the lubricating oil supply controlling controller 50 through the electrical signal line 31. And, control information of the transmission controller 40 is sent to the lubricating oil supply controlling controller 50 through the electrical signal line 41. A data frame signal in accordance with a prescribed protocol is sent between the individual controllers. In the engine controller 30, the control information which is in the engine controller 30 is written in the data frame signal, and it is sent to the electrical signal line 31. In the transmission controller 40, the control information which is in the transmission controller 40 is written in the data frame signal, and it is sent to the electrical signal line 41.

In the lubricating oil supply controlling controller 50, the control information of the engine controller 30 and the control information of the transmission controller 40 are read from the input data frame signal (step 101).

Then, according to the control information of the engine controller 30 and the control information of the transmission controller 40, it is judged whether or not a load of the engine 1 and a load of the transmission 3 are low (steps 102, 103). If the load of the engine 1 or the load of the transmission 3 is low (judged YES in step 102 or judged YES in step 103), it is judged that the lubricating oil which is supplied to the transmission 3 is excessive and must be reduced. In other words, if the load is light, the lubricating oil is sufficient in a small amount to protect the component parts of the transmission 3 by decreasing the mechanical friction and cooling by the lubricating oil. If the oil is supplied in an amount more than necessary, it becomes resistant when the planetary gear and the like revolve, a power loss is caused, and the fuel consumption of the engine 1 becomes poor. Therefore, when it is judged that the load is light and the lubricating oil to be supplied to the transmission 3 must be decreased, the control electric signal i for decreasing the lubricating oil to be supplied to the transmission 3 is output in order to decrease the lubricating oil which is supplied to the transmission 3 (step 104). After the process in step 104, the process returns to step 101.

Specifically, it is judged whether or not a load a (fuel injection quantity) of the engine 1 is a prescribed threshold value ac or less, namely it is judged whether or not the engine 1 is operating under a low load. Here, the threshold value ac can be set to 70% of the maximum torque (step 102).

It is also judged whether or not a speed stage $\beta$ which is selected by the transmission 3 is a light-load speed stage $\beta c$, namely it is judged whether or not the transmission 3 is operating under a low load. Here, the light-load speed stage $\beta c$ is set to, for example, "forward 4th-speed" which is the forward maximum speed stage. The case where the "forward 4th-speed" is selected is a case where the forward hydraulic clutch and the four speed hydraulic clutch are mutually engaged (step 103).

If it is judged NO in steps 102 and 103, it is judged that the lubricating oil to be supplied to the transmission 3 must be increased. In other words, where the load is high, the oil is required in a large amount to protect the component parts of the transmission 3 by reducing the mechanical friction and cooling by the lubricating oil. Therefore, where the load is high and it is judged that the lubricating oil to be supplied to the transmission 3 must be increased, the process returns to step 101 with the control electric signal i for decreasing the lubricating oil to be supplied to the transmission 3 remaining off so that the lubricating oil to be supplied to the transmission 3 is not decreased.

An operation of this embodiment will be described additionally referring to the hydraulic circuit of FIG. 2.

Where the output of the control electric signal i from the lubricating oil supply controlling controller 50 is off (judged NO in steps 102 and 103), the control electric signal i is not added to the electromagnetic solenoid 26e of the electromagnetic control valve 26, and the electromagnetic control valve 26 is switched to the lubricating oil supply position 26A by the spring force of the spring 26g.

The lubricating oil which is in the lubricating oil tank 8 is sucked from the suction port 9a of the lubricating oil pump 9 through a sucking oil passage 10 and discharged from the discharge port 9b of the lubricating oil pump 9 to the pump outlet oil passage 11. The lubricating oil which is pump outlet pressure oil is supplied to the torque converter 2 via the pump outlet oil passage 11, the main relief valve 13 and the oil passage 14. The lubricating oil which is supplied to the torque converter 2 is used as operating oil for transmitting the driving force of the torque converter 2.

The lubricating oil guided to the oil passage 14 is supplied to the PTO shaft 7 via the oil passage 15 and the restrictor 15a disposed in the oil passage 15. Thus, the component parts of the PTO shaft 7 are lubricated. The lubricating oil which has lubricated the PTO shaft 7 is discharged to the lubricating oil tank 8.

The lubricating oil which has flown through the torque converter 2 is guided to the lubricating oil supplying oil passage 17 via the oil cooler 16.

The lubricating oil which is guided to the lubricating oil supplying oil passage 17 is supplied to the transmission 3. Thus, the transmission 3 is lubricated. The lubricating oil which has lubricated the transmission 3 is discharged to the lubricating oil tank 8.

The lubricating oil which is guided to the pump outlet oil passage 11 is supplied as the pilot pressure oil (pilot pressure Pc) to the inlet port 26c of the electromagnetic control valve 26 through the pilot oil passage 25.

Here, the pilot pressure oil which is supplied to the inlet port 26c is cut off by the inlet port 26c of the electromagnetic control valve 26 because the electromagnetic control valve 26 has been switched to the lubricating oil supply position 26A. The pilot port 22d of the relief valve 22 is communicated with the lubricating oil tank 8 via the pilot oil passage 27, the outlet port 26d and the tank port 26f of the electromagnetic control valve 26, and the oil passage 29.

Therefore, the pressure acting on the pilot port 22d of the relief valve 22 becomes a tank pressure, and the relief valve 22 does not reach a predetermined relief pressure and is closed by the spring force of the spring 22c.

Therefore, the lubricating oil, which is guided to the lubricating oil supplying oil passage 17, is not discharged to the lubricating oil tank 8 via the bypass oil passage 21, the relief valve 22 and the bypass oil passage 23, but its all amount is supplied to the transmission 3.

Meanwhile, in a case where the control electric signal i is being output from the lubricating oil supply controlling controller 50 (judged YES in step 102 or 103, step 104), a pushing force is generated by the electromagnetic solenoid 26e of the electromagnetic control valve 26, and the pushing force becomes more powerful than the spring force of the spring 26g, and the electromagnetic control valve 26 is switched to the lubricating oil discharge position 26B.

Thus, the inlet port 26c and the outlet port 26d of the electromagnetic control valve 26 are mutually communicated, the pilot pressure oil (pilot pressure Pc) which is supplied to the inlet port 26c is applied to the pilot port 22d of the relief valve 22 through the outlet port 26d of the electromagnetic control valve 26 and the pilot oil passage 27.

The pilot pressure Pc acting on the pilot port 22d of the relief valve 22 is equivalent to or higher than the predetermined relief pressure of the relief valve 22, a force corresponding to the pilot pressure Pc becomes more powerful than the spring force of the spring 22c, and the relief valve 22 is opened.

Therefore, the lubricating oil which is guided to the lubricating oil supplying oil passage 17 is partly flown through the relief valve 22 via the bypass oil passage 21. The lubricating oil which has passed through the relief valve 22 is discharged to the lubricating oil tank 8 through the bypass oil passage 23 and the restrictor 28.

And, the rest of the lubricating oil which has been guided to the lubricating oil supplying oil passage 17 is supplied to the transmission 3.

A ratio of a discharge flow rate of the lubricating oil which is discharged to the lubricating oil tank 8 from the lubricating oil supplying oil passage 17 through the relief valve 22 and a supply flow rate of the lubricating oil which is supplied from the lubricating oil supplying oil passage 17 to the transmission 3 can be adjusted depending on the setting of a size of the opening area of the restrictor 28 which is disposed in the outlet side of the relief valve 22.

The discharge flow rate of the lubricating oil, which is discharged from the lubricating oil supplying oil passage 17 to the lubricating oil tank 8 through the relief valve 22, becomes higher as the opening area of the restrictor 28 becomes larger, and the supply flow rate of the lubricating oil which is supplied from the lubricating oil supplying oil passage 17 to the transmission 3 decreases.

If clogging or the like occurs within the transmission 3, the pressure of the lubricating oil within the bypass oil passage 21 increases. Therefore, a pressure which acts on the pressure receiving surface of the relief valve 22, which is the opposite side to the spring 22c, through the bypass oil passage 21 and the pilot oil passage 24 increases to become higher than the predetermined relief pressure, and the relief valve 22 is opened. Therefore, if the clogging or the like occurs within the transmission 3, the lubricating oil, which is guided to the lubricating oil supplying oil passage 17, is partly discharged to the lubricating oil tank 8 through the bypass oil passage 21, the relief valve 22, the bypass oil passage 23 and the restrictor 28 even if the output of the control electric signal i from the lubricating oil supply controlling controller 50 is off (judged NO in steps 102 and 103).

According to this embodiment described above, if the load of the engine 1 is low or the load of the transmission 3 is low (judged YES in step 102 or judged YES in step 103), the control electric signal i is output from the lubricating oil supply controlling controller 50 (step 104), and the lubricating oil which should be supplied to the transmission 3 is partly discharged to the lubricating oil tank 8, so that the mechanical friction of the transmission 3 is decreased and cooling is performed to protect the component parts of the transmission 3, and the excessive supply of the lubricating oil is prevented to decrease a power loss of the transmission 3, thereby capable of improving the fuel consumption of the engine 1 and attaining energy saving.

And, according to this embodiment, the supply of the lubricating oil is controlled so that control information of the engine controller 30 and control information of the transmission controller 40 are input to the lubricating oil supply controlling controller 50, and the control electric signal i is generated and output in accordance with the control information to operate the relief valve 22. Therefore, the control system can be configured easily at a low cost by using conventional control information, which is used for the conventional engine controller 30 and transmission controller 40, for the vehicle control system. In other words, it is not necessary to add a new sensor in order to obtain the control information. And, it is not necessary to perform signal processing of the detected signal from the sensor by the controller to convert it to an engineering unit required for arithmetic processing. And, it is not necessary to newly calculate a load of the engine and a load of the transmission by the controller in accordance with the detection values by the various types of sensors. Therefore, the processing performed by the controller can be simplified as exemplified in FIG. 3.

According to this embodiment, the hydraulic circuit is configured so that the relief valve 22 is operated to discharge the lubricating oil, which is in the lubricating oil supplying oil passage 17, to the lubricating oil tank 8 through the bypass oil passage 21, the relief valve 22 and the bypass oil passage 23. Therefore, it is sufficient by adding a valve body and piping for discharging the lubricating oil which is in the lubricating oil supplying oil passage 17 to the existing lubricating oil supplying oil passage 17 of the hydraulic circuit, so that the structure of valve bodies and the arrangement of hydraulic pipings can be made simple and the cost can be reduced when the hydraulic device is configured.

The above-described first embodiment can be modified in various ways.

Although, in the first embodiment, the control information of the engine controller 30 and the control information of the transmission controller 40 are input to the lubricating oil supply controlling controller 50, either the control information of the engine controller 30 or the control information of the transmission controller 40 may be input. In this case, either processing in step 102 or step 103 is omitted in the processing shown in FIG. 3.

In the first embodiment, both the control information of the engine controller 30 and the control information of the transmission controller 40 are input to the lubricating oil supply controlling controller 50. And if it is established whether the load of the engine 1 is low or the load of the transmission 3 is low as shown in FIG. 3 (judged YES in step 102 or judged YES in step 103), the control electric signal i for operating the relief valve 22 is output (step 104).

Figure 4:
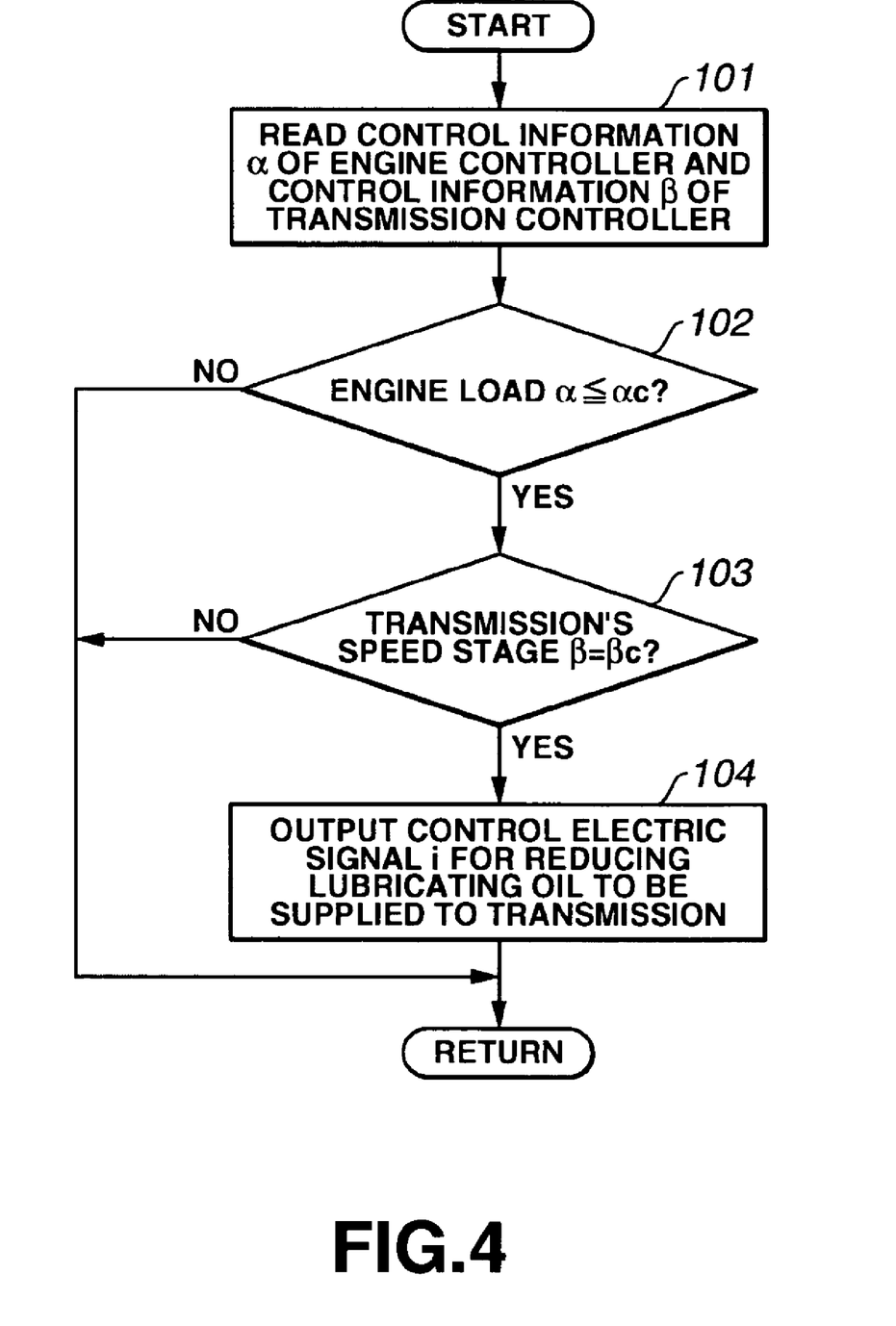
FIG. 4 is a flow chart showing another processing procedure different from FIG. 3.

As shown in FIG. 4, however, it is also possible to output the control electric signal i for operating the relief valve 22 (step 104) on condition that the load of the engine 1 is low and the load of the transmission 3 is low (judged YES in step 102 and judged YES in step 103).

And, in the first embodiment, the control electric signal which is output from the engine controller 30 to an electric governor of the engine 1 is input as control information to the lubricating oil supply controlling controller 50. It is just an example, and the detection value of the stroke sensor 6a which is input to the engine controller 30, namely an operation amount of the gas pedal 6, may be input as control information indicating the load of the engine 1 to the lubricating oil supply controlling controller 50. Where the operation amount of the gas pedal 6 is not higher than a prescribed operation amount, it may be judged by the lubricating oil supply controlling controller 50 that the load of the engine 1 is small.

In the first embodiment, the restrictor 28 is disposed in the bypass oil passage 23 on the outlet side of the relief valve 22 to discharge the lubricating oil having a flow rate corresponding to the opening area of the restrictor 28 to the lubricating oil tank 8. But, the restrictor 28 may be disposed in the bypass oil passage 21 on the inlet side of the relief valve 22 instead of its disposition in the bypass oil passage 23. And, the restrictor 28 may be disposed in each of the bypass oil passage 23 on the outlet side of the relief valve 22 and the bypass oil passage 21 on the inlet side of the relief valve 22.

Second Embodiment

In the first embodiment, the pilot pressure oil (pilot pressure Pc) which is output from the electromagnetic control valve 26 is caused to act on the pilot port 22d of the relief valve 22, such that the relief valve 22 operates to open. By configuring in this way, the electromagnetic solenoid (the electromagnetic solenoid 26e of the electromagnetic control valve 26) to which the control electric signal i is input can be made compact.

Figure 5A:
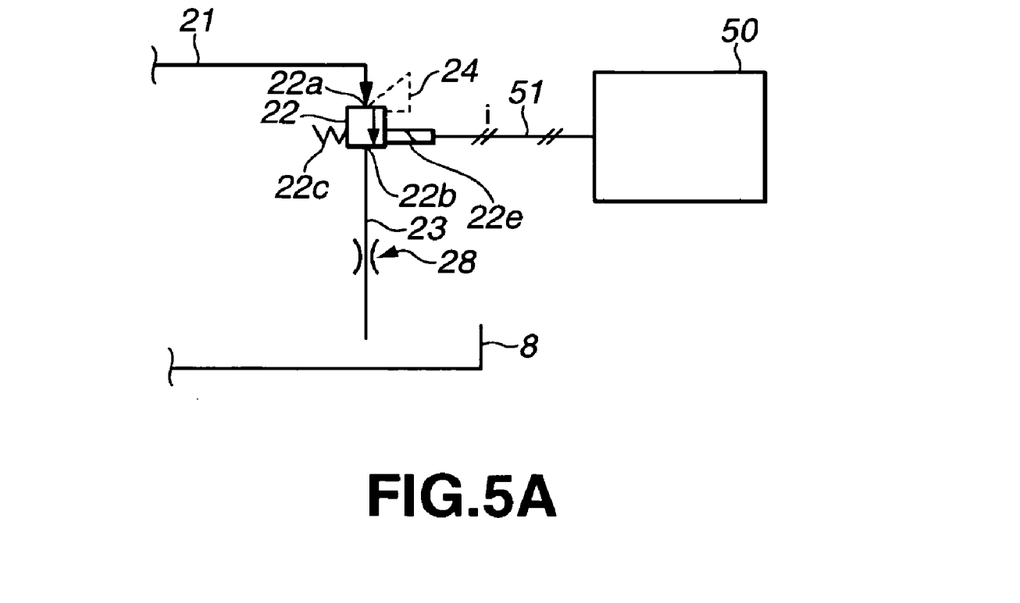
FIG. 5A and FIG. 5B are hydraulic circuit diagrams of the second embodiment and the fourth embodiment.

As shown in FIG. 5A, however, it may be configured to make the control electric signal i output from the lubricating oil supply controlling controller 50 directly act on the relief valve 22 through the electrical signal line 51.

In other words, FIG. 5A is a diagram of a hydraulic circuit corresponding to FIG. 2. It should be noted that component elements not shown in FIG. 5A are same as those of FIG. 2 unless otherwise specified. In FIG. 5A, however, the disposition of the electromagnetic control valve 26, the pilot oil passages 25, 27 and the discharge oil passage 29 which are disposed in the hydraulic circuit of FIG. 2 are omitted. And, the relief valve 22 is provided with an electromagnetic solenoid 22e instead of the pilot port 22d show in FIG. 2.

Where the control electric signal i is not output from the lubricating oil supply controlling controller 50, the electromagnetic solenoid 22e of the relief valve 22 is not energized, and the relief valve 22 is closed by the spring force of the spring 22c.

Therefore, the lubricating oil, which is guided to the lubricating oil supplying oil passage 17, is not discharged to the lubricating oil tank 8 through the bypass oil passage 21, the relief valve 22 and the bypass oil passage 23, but its all amount is supplied to the transmission 3.

Meanwhile, where the control electric signal i is being output from the lubricating oil supply controlling controller 50, a pushing force is generated by the electromagnetic solenoid 22e of the relief valve 22, and the pushing force becomes more powerful than the spring force of the spring 22c, and the relief valve 22 is opened.

Therefore, the lubricating oil which is guided to the lubricating oil supplying oil passage 17 is partly discharged to the lubricating oil tank 8 through the bypass oil passage 21, the relief valve 22, the bypass oil passage 23 and the restrictor 28. And, the rest of the lubricating oil which is guided to the lubricating oil supplying oil passage 17 is supplied to the transmission 3.

Third Embodiment

In the above-described embodiment, the relief valve 22 is used as the control valve to discharge the lubricating oil to the lubricating oil tank 8 through the bypass circuits 21, 23. But, a control valve other than the relief valve 22 can also be used to discharge the lubricating oil. Specifically, any type of control valve may be used if it adjusts an amount of the lubricating oil which is guided to the transmission 3 through the lubricating oil supplying oil passage 17 and an amount of the lubricating oil which is guided from the lubricating oil supplying oil passage 17 to the lubricating oil tank 8 through the bypass oil passage 23.

FIG. 6 is a diagram of the hydraulic circuit of this embodiment and corresponds to FIG. 2. It should be noted that component elements not shown in FIG. 6 are same as those of FIG. 2 unless otherwise specified.

As shown in FIG. 6, the control valve 60 configured as a two position valve is disposed instead of the relief valve 22 of FIG. 2.

The outlet of the oil cooler 16 is communicated with the lubricating oil supplying oil passage 17.

The lubricating oil supplying oil passage 17 is communicated with an inlet port 60c of the control valve 60. An outlet port 60d of the control valve 60 is communicated with the transmission 3 and supplies the lubricating oil to the speed change mechanism section of the transmission 3, the clutch portion and the like.

A tank port 60f of the control valve 60 is communicated with the bypass oil passage 23. The bypass oil passage 23 is communicated with the lubricating oil tank 8.

The control valve 60 is a two position valve having two valve positions 60A (lubricating oil supply position) and 60B (lubricating oil discharge position). The control valve 60 is switched between the valve positions 60A and 60B in accordance with the pilot pressure Pc which is applied to a pilot port 60e. The pilot port 60e is communicated with the outlet port 26d of the electromagnetic control valve 26 through the pilot oil passage 27.

One end of a spring 60g is contacted on the spool of the control valve 60 on the side opposite to the pilot port 60e. The pressure receiving surface of the spool of the control valve 60 on the pilot port 60e side (the opposite side of the spring 60g) is communicated with the inlet port 60c through the pilot oil passage 24.

When the control valve 60 is switched to the lubricating oil supply position 60A, the inlet port 60c is communicated with the outlet port 60d via a restrictor 61.

When the control valve 60 is switched to the lubricating oil discharge position 60B, the inlet port 60c is communicated with the outlet port 60d via a restrictor 62, and the inlet port 60c is communicated with the tank port 60f via a restrictor 63.

A ratio of a discharge flow rate of the lubricating oil which is discharged from the lubricating oil supplying oil passage 17 to the lubricating oil tank 8 through the control valve 60 and a supply flow rate of the lubricating oil which is supplied from the lubricating oil supplying oil passage 17 to the transmission 3 can be adjusted by adjusting a ratio of the opening area of the restrictor 63 and the opening area of the restrictor 62 which are disposed in the control valve 60.

The discharge flow rate of the lubricating oil which is discharged from the lubricating oil supplying oil passage 17 to the lubricating oil tank 8 through the control valve 60 becomes higher while the supply flow rate of the lubricating oil which is supplied from the lubricating oil supplying oil passage 17 to the transmission 3 decreases as the opening area of the restrictor 63 is made larger in comparison with the opening area of the restrictor 62.

Then, an operation to be performed by the hydraulic circuit of FIG. 6 will be described assuming that the processing shown in FIG. 3 or FIG. 4 has been performed by the lubricating oil supply controlling controller 50.

Where the output of the control electric signal i from the lubricating oil supply controlling controller 50 is off, the control electric signal i is not added to the electromagnetic solenoid 26e of the electromagnetic control valve 26, and the electromagnetic control valve 26 is switched to the lubricating oil supply position 26A by the spring force of the spring 26g.

The lubricating oil which has flown through the torque converter 2 is guided to the lubricating oil supplying oil passage 17 via the oil cooler 16.

The lubricating oil which is guided to the lubricating oil supplying oil passage 17 is supplied to the inlet port 60c of the control valve 60.

The lubricating oil which is guided to the pump outlet oil passage 11 is supplied as the pilot pressure oil (pilot pressure Pc) to the inlet port 26c of the electromagnetic control valve 26 through the pilot oil passage 25.

Here, the pilot pressure oil which is supplied to the inlet port 26c is cut off at the inlet port 26c of the electromagnetic control valve 26 because the electromagnetic control valve 26 has been switched to the lubricating oil supply position 26A. The pilot port 60e of the control valve 60 is communicated with the lubricating oil tank 8 via the pilot oil passage 27, the outlet port 26d and the tank port 26f of the electromagnetic control valve 26, and the oil passage 29.

Therefore, the pressure acting on the pilot port 60e of the control valve 60 becomes a tank pressure, and the control valve 60 is positioned at the lubricating oil supply position 60A by the spring force of the spring 60g.

Therefore, the lubricating oil, which is guided to the lubricating oil supplying oil passage 17, is supplied in full amount to the transmission 3 through the restrictor 60d of the control valve 60.

Therefore, the lubricating oil, which is guided to the lubricating oil supplying oil passage 17, is not discharged to the lubricating oil tank 8 through the bypass oil passage 23 but its all amount is supplied to the transmission 3.

On the other hand, where the control electric signal i is output from the lubricating oil supply controlling controller 50, a pushing force is generated by the electromagnetic solenoid 26e, and the pushing force becomes more powerful than the spring force of the spring 26g, and the electromagnetic control valve 26 is switched to the lubricating oil discharge position 26B.

Thus, the inlet port 26c and the outlet port 26d of the electromagnetic control valve 26 are mutually communicated, the pilot pressure oil (pilot pressure Pc) which is supplied to the inlet port 26c is applied to the pilot port 60e of the control valve 60 through the outlet port 26d of the electromagnetic control valve 26 and the pilot oil passage 27.

A force corresponding to the pilot pressure Pc, which acts on the pilot port 60e of the control valve 60, becomes more powerful than the spring force of the spring 60g, and the control valve 60 is positioned at the lubricating oil discharge position 60B.

Therefore, the lubricating oil, which is guided to the lubricating oil supplying oil passage 17, is partly discharged to the lubricating oil tank 8 through the restrictor 63 of the control valve 60 and the bypass oil passage 23. And, the rest of the lubricating oil, which has been guided to the lubricating oil supplying oil passage 17, is supplied to the transmission 3 via the restrictor 62 of the control valve 60.

If clogging or the like occurs within the transmission 3, the pressure of the inlet port 60c of the control valve 60 increases. Therefore, through the pilot oil passage 24, the pressure which acts on the pressure receiving surface of the control valve 60 on the opposite side of the spring 60g increases, and the control valve 60 is switched to the lubricating oil supply position 60B. Therefore, if clogging or the like occurs within the transmission 3, even when the output of the control electric signal i from the lubricating oil supply controlling controller 50 is off, the lubricating oil, which has been guided to the lubricating oil supplying oil passage 17, is partly discharged to the lubricating oil tank 8 through the control valve 60 and the bypass oil passage 23.

Fourth Embodiment

In the above-described third embodiment, the pilot pressure oil (pilot pressure Pc) which is output from the electromagnetic control valve 26 is caused to act on the pilot port 60e of the control valve 60 to make the control valve 60 perform a switching operation. By configuring in this way, the electromagnetic solenoid (electromagnetic solenoid 26e of the electromagnetic control valve 26) to which the control electric signal i is applied can be made compact.

Figure 5B:
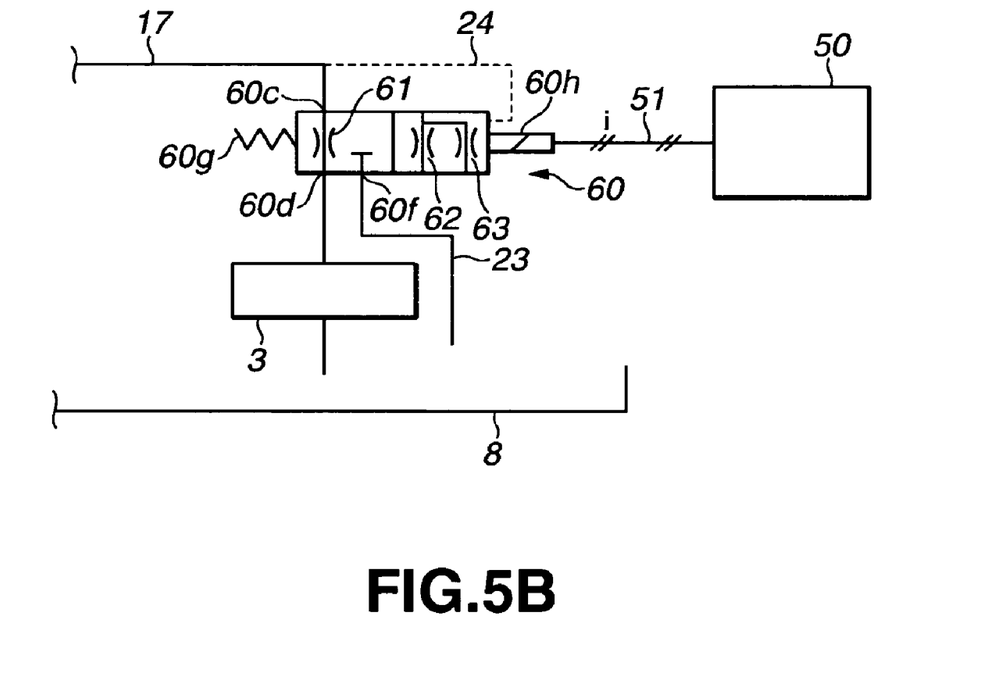

As show in FIG. 5B, however, it may be configured such that the control electric signal i, which is output from the lubricating oil supply controlling controller 50, is directly acted on the electromagnetic solenoid 60h of the control valve 60 through the electrical signal line 51 in the same manner as in FIG. 5A.

Fifth Embodiment

In the above-described third embodiment and fourth embodiment, the position of the control valve 60 is switched in binary depending on the judged result whether the load is small or not, but the position of the control valve 60 may be changed continuously depending on the magnitude of the load.

Specifically, it may be controlled by the lubricating oil supply controlling controller 50, such that the control electric signal i for changing the control valve 60 to a position corresponding to the magnitude of the load is generated and output in accordance with control information on the magnitude of the load of the engine 1 or the load of the transmission 3, the control valve 60 is gradually moved from the lubricating oil discharge position B side to the lubricating oil supply position A side as the load becomes larger, and the control valve 60 is gradually moved from the lubricating oil supply position A side to the lubricating oil discharge position B side as the load becomes smaller.

The above-described individual embodiments were described assuming that the control information of the engine controller 30 and the transmission controller 40 was input to the lubricating oil supply controlling controller 50, and the supply of the lubricating oil was controlled. But, it is also possible to control the supply of the lubricating oil by the lubricating oil supply controlling controller 50 in accordance with information other than the control information of the engine controller 30 and the transmission controller 40. For example, it may be conducted by inputting an existing sensor-detected signal to the lubricating oil supply controlling controller 50, performing arithmetic processing in accordance with the sensor-detected value, and generating and outputting the control electric signal i.

In the above-described embodiments, it was assumed that the vehicle was a wheel loader, the engine was a diesel engine, and the transmission was a planetary gear transmission. But, the present invention can be applied regardless of a vehicle type, an engine type, and a transmission structure. In other words, the present invention can be applied to not only construction machines but also vehicles other than the construction machines. The invention may be applied to a vehicle having a gasoline engine and a vehicle having a parallel-shaft gear transmission not using a hydraulic clutch.

The invention claimed is:

1. A lubricating oil supply control device for a transmission of a vehicle that is driven by an output of an engine transmitted to the transmission, the lubricating oil supply control device comprising:
an engine controller for outputting a control signal which indicates a fuel injection quantity to control the engine;
a transmission controller for outputting a control signal which indicates a speed stage currently selected to control the transmission;
a lubricating oil supplying oil passage for guiding a lubricating oil from a torque converter to the transmission after the lubricating oil has been discharged from a hydraulic pump;
a bypass oil passage for guiding a portion of the lubricating oil from the lubricating oil supplying oil passage to a tank such that the portion of the lubricating oil bypasses the transmission;
a relief valve disposed in the bypass oil passage for permitting the portion of the lubricating oil to flow to the tank through the bypass oil passage, the relief valve being operated in accordance with a control signal;
a restrictor at least partially restricting a flow of the portion of the lubricating oil controlled by the relief valve into the tank; and
a lubricating oil supply controller which receives the control signal output from the engine controller and the control signal output from the transmission as control information,
wherein the lubricating controller generates and outputs a control signal for operating the relief valve in accordance with the control information received from the engine controller and the transmission controller when the control information indicates that the fuel injection quantity of the engine is not more than a prescribed threshold value, or that the speed stage currently selected by the transmission is a set light load speed stage, or that the fuel injection quantity of the engine is not more than a prescribed threshold value and the speed stage currently selected by the transmission is the set light load speed stage.

2. The device of claim 1, wherein the restrictor is adjustable between a restricted position and an unrestricted position, the restricted position at least partially restricting a flow of the portion of the lubricating oil into the tank.

3. The device of claim 2, wherein the restricted position at least partially restricts the flow of the portion of the lubricating oil into the tank such that more oil flows to the transmission when the restrictor is adjusted to the restricted position than when the restrictor is adjusted to the unrestricted position.

4. The device of claim 1, wherein the bypass oil passage is provided downstream of the torque converter such that the lubricating oil supply control device is operable to adjust a volume of the lubricating oil supplied to the transmission without adjusting a volume of the lubricating oil supplied to the torque converter.

5. The device of claim 1, wherein the relief valve is adjustable between an open state and a closed state,
wherein the relief valve is arranged such that in the closed state of the relief valve an entirety of the lubricating oil in the lubricating oil supplying oil passage is guided to the transmission, and in the open state of the relief valve a portion of the lubricating oil is guided to the bypass oil passage such that the portion of the lubricating oil bypasses the transmission, and
wherein the lubricating controller generates and outputs a control signal putting the relief valve in the open position when the control information indicates that the fuel injection quantity of the engine is not more than a prescribed threshold value,
wherein the lubricating controller generates and outputs the control signal putting the relief valve in the open position when the control information indicates that the speed stage currently selected by the transmission is a set light load speed stage, and
wherein the lubricating controller generates and outputs the control signal putting the relief valve in the open position when the control information indicates that the fuel injection quantity of the engine is not more than a prescribed threshold value and the speed stage currently selected by the transmission is the set light load speed stage.

6. A lubricating oil supply control device for a transmission of a vehicle that is driven by an output of an engine transmitted to the transmission, the lubricating oil supply control device comprising:
an engine controller for outputting a control signal which indicates a fuel injection quantity to control the engine;
a transmission controller for outputting a control signal which indicates a speed stage currently selected by the transmission to control the transmission;
a lubricating oil supplying oil passage for guiding a lubricating oil from a torque converter to the transmission after the lubricating oil has been discharged from a hydraulic pump;
a bypass oil passage for guiding a portion of the lubricating oil from the lubricating oil supplying oil passage to a tank such that the portion of the lubricating oil bypasses the transmission;
a relief valve disposed in the bypass oil passage for permitting the portion of the lubricating oil to flow to the tank through the bypass oil passage, the relief valve being operated in accordance with a control signal;
a restrictor at least partially restricting a flow of the portion of the lubricating oil controlled by the relief valve into the tank; and
a lubricating oil supply controller which receives the control signal output from the engine controller and the control signal output from the transmission as control information,
wherein the lubricating controller generates and outputs a control signal for operating the relief valve in accordance with the control information received from the engine controller and the transmission controller when the control information indicates that the fuel injection quantity of the engine is not more than a prescribed threshold value, or that the speed stage currently selected by the transmission is a set light load speed stage, or that the fuel injection quantity of the engine is not more than a prescribed threshold value and the speed stage currently selected by the transmission is the set light load speed stage,
wherein the relief valve is adjustable between an open state and a closed state, and
wherein the relief valve is disposed in the bypass oil passage such that in the closed state of the relief valve an entirety of the lubricating oil in the lubricating oil supplying oil passage is guided to the transmission.

7. The device of claim 6, wherein
a ratio of a discharge flow rate of the lubricating oil which is discharged to the lubricating oil tank from the lubricating oil supplying oil passage through the relief valve and a supply flow rate of the lubricating oil which is supplied from the lubricating oil supplying oil passage to the transmission can be adjusted depending on the setting of a size of the opening area of the restrictor.

8. The device of claim 7, wherein the restrictor is adjustable between a restricted position and an unrestricted position, the restricted position at least partially restricting a flow of the portion of the lubricating oil into the tank.

9. The device of claim 8, wherein the restricted position at least partially restricts the flow of the portion of the lubricating oil into the tank such that more oil flows to the transmission when the restrictor is adjusted to the restricted position than when the restrictor is adjusted to the unrestricted position.

10. The device of claim 6, wherein
a ratio of a discharge flow rate of the lubricating oil which is discharged to the lubricating oil tank from the lubricating oil supplying oil passage through the relief valve and a supply flow rate of the lubricating oil which is supplied from the lubricating oil supplying oil passage to the transmission can be adjusted depending on the setting of a size of the opening area of the restrictor.

11. The device of claim 7, wherein the bypass oil passage is provided downstream of the torque converter such that the lubricating oil supply control device is operable to adjust a volume of the lubricating oil supplied to the transmission without adjusting a volume of the lubricating oil supplied to the torque converter.

12. The device of claim 6, wherein the relief valve is configured such that in the open state of the relief valve a portion of the lubricating oil is guided to the bypass oil passage such that the portion of the lubricating oil bypasses the transmission, and
wherein the lubricating controller generates and outputs a control signal putting the relief valve in the open position when the control information indicates that the fuel injection quantity of the engine is not more than a prescribed threshold value,
wherein the lubricating controller generates and outputs the control signal putting the relief valve in the open position when the control information indicates that the speed stage currently selected by the transmission is a set light load speed stage, and
wherein the lubricating controller generates and outputs the control signal putting the relief valve in the open position when the control information indicates that the fuel injection quantity of the engine is not more than a prescribed threshold value and the speed stage currently selected by the transmission is the set light load speed stage.

13. A lubricating oil supply control device for a transmission of a vehicle that is driven by an output of an engine transmitted to the transmission, the lubricating oil supply control device comprising:
   an engine controller for outputting a control signal which indicates a fuel injection quantity to control the engine;
   a transmission controller for outputting a control signal which indicates a speed stage currently selected by the transmission to control the transmission;
   a lubricating oil supplying oil passage for guiding a lubricating oil from a torque converter to the transmission after the lubricating oil has been discharged from a hydraulic pump;
   a bypass oil passage for guiding a portion of the lubricating oil from the lubricating oil supplying oil passage to a tank such that the portion of the lubricating oil bypasses the transmission;
   a relief valve disposed in the bypass oil passage for permitting the portion of the lubricating oil to flow to the tank through the bypass oil passage, the relief valve being operated in accordance with a control signal;
   a restrictor at least partially restricting a flow of the portion of the lubricating oil controlled by the relief valve into the tank; and
   a lubricating oil supply controller which receives the control signal output from the engine controller and the control signal output from the transmission as control information,
   wherein the lubricating controller generates and outputs a control signal for operating the relief valve in accordance with the control information received from the engine controller and the transmission controller when the control information indicates that the fuel injection quantity of the engine is not more than a prescribed threshold value, or that the speed stage currently selected by the transmission is a set light load speed stage, or that the fuel injection quantity of the engine is not more than a prescribed threshold value and the speed stage currently selected by the transmission is the set light load speed stage,
   wherein the relief valve is adjustable between an open state and a closed state,
   wherein the relief valve is disposed in the bypass oil passage such that in the closed state of the relief valve an entirety of the lubricating oil in the lubricating oil supplying oil passage is guided to the transmission,
   wherein the restrictor is disposed in the bypass oil passage such that the portion of the lubricating oil in the bypass oil passage passes through one of the restrictor and the relief valve and then passes through the other of the restrictor and the relief valve,
   wherein the
   a ratio of a discharge flow rate of the lubricating oil which is discharged to the lubricating oil tank from the lubricating oil supplying oil passage through the relief valve and a supply flow rate of the lubricating oil which is supplied from the lubricating oil supplying oil passage to the transmission can be adjusted depending on the setting of a size of the opening area of the restrictor,
   wherein the restrictor is adjustable between a restricted position and an unrestricted position, the restricted position at least partially restricting a flow of the portion of the lubricating oil into the tank,
   wherein the restricted position at least partially restricts the flow of the portion of the lubricating oil into the tank such that more oil flows to the transmission when the restrictor is adjusted to the restricted position than when the restrictor is adjusted to the unrestricted position, and
   wherein the bypass oil passage is provided downstream of the torque converter such that the lubricating oil supply control device is operable to adjust a volume of the lubricating oil supplied to the transmission without adjusting a volume of the lubricating oil supplied to the torque converter.

14. The device of claim 13, wherein the relief valve is configured such that in the open state of the relief valve a portion of the lubricating oil is guided to the bypass oil passage such that the portion of the lubricating oil bypasses the transmission, and
   wherein the lubricating controller generates and outputs a control signal putting the relief valve in the open position when the control information indicates that the fuel injection quantity of the engine is not more than a prescribed threshold value,
   wherein the lubricating controller generates and outputs the control signal putting the relief valve in the open position when the control information indicates that the speed stage currently selected by the transmission is a set light load speed stage, and
   wherein the lubricating controller generates and outputs the control signal putting the relief valve in the open position when the control information indicates that the fuel injection quantity of the engine is not more than a prescribed threshold value and the speed stage currently selected by the transmission is the set light load speed stage.

15. A lubricating oil supply control device for a transmission of a vehicle that is driven by an output of an engine transmitted to the transmission, the lubricating oil supply control device comprising:
   an engine controller for outputting a control signal which indicates a fuel injection quantity to control the engine;
   a transmission controller for outputting a control signal which indicates a speed stage currently selected by the transmission to control the transmission;
   a lubricating oil supplying oil passage for guiding a lubricating oil from a torque converter to the transmission after the lubricating oil has been discharged from a hydraulic pump;
   a bypass oil passage for guiding a portion of the lubricating oil from the lubricating oil supplying oil passage to a tank such that the portion of the lubricating oil bypasses the transmission;
   a relief valve for discharging the lubricating oil in the lubricating oil supplying oil passage into the tank through the bypass oil passage, the relief valve being operated in accordance with a control signal;
   a restrictor disposed on an exit side or an entry side of the relief valve; and
   a lubricating oil supply controller which receives the control signal output from the engine controller and the control signal output from the transmission as control information,
   wherein the lubricating controller generates and outputs a control signal for operating the relief valve in accordance with the control information received from the engine controller and the transmission controller when the control information indicates that the fuel injection quantity of the engine is not more than a prescribed threshold value, or that the speed stage currently selected by the transmission is a set light load speed stage, or that the fuel injection quantity of the engine is not more than a prescribed threshold value and the speed stage currently selected by the transmission is the set light load speed stage.

16. The device of claim 15, wherein the relief valve is adjustable between an open state and a closed state,
    wherein the relief valve is arranged such that in the closed state of the relief valve an entirety of the lubricating oil in the lubricating oil supplying oil passage is guided to the transmission, and in the open state of the relief valve a portion of the lubricating oil is guided to the bypass oil passage such that the portion of the lubricating oil bypasses the transmission,
    wherein the lubricating controller generates and outputs a control signal putting the relief valve in the open position when the control information indicates that the fuel injection quantity of the engine is not more than a prescribed threshold value,
    wherein the lubricating controller generates and outputs the control signal putting the relief valve in the open position when the control information indicates that the speed stage currently selected by the transmission is a set light load speed stage, and
    wherein the lubricating controller generates and outputs the control signal putting the relief valve in the open position when the control information indicates that the fuel injection quantity of the engine is not more than a prescribed threshold value and the speed stage currently selected by the transmission is the set light speed stage.

* * * * *